(12) United States Patent
Craddock et al.

(10) Patent No.: US 12,323,088 B1
(45) Date of Patent: Jun. 3, 2025

(54) SOLAR PANEL SUPPORT

(71) Applicants: Gary D. Craddock, Bradenton, FL (US); Paxton Craddock, Bradenton, FL (US)

(72) Inventors: Gary D. Craddock, Bradenton, FL (US); Paxton Craddock, Bradenton, FL (US)

( * ) Notice: Subject to any disclaimer, the term of this patent is extended or adjusted under 35 U.S.C. 154(b) by 0 days.

(21) Appl. No.: 18/221,971

(22) Filed: Jul. 14, 2023

Related U.S. Application Data

(60) Provisional application No. 63/389,143, filed on Jul. 14, 2022.

(51) Int. Cl.
*H02S 20/22* (2014.01)

(52) U.S. Cl.
CPC .................... *H02S 20/22* (2014.12)

(58) Field of Classification Search
CPC .......... H02S 20/22; H02S 20/23; H02S 20/26; H02S 30/10; F24S 25/65; F24S 25/30; F24S 25/61; F24S 25/63
USPC .... 52/173.3, 299; 248/205.1, 156, 371, 159, 248/176.1
See application file for complete search history.

(56) References Cited

U.S. PATENT DOCUMENTS

| | | | |
|---|---|---|---|
| 7,018,063 B2 | 3/2006 | Michael et al. | |
| 7,958,886 B2 * | 6/2011 | Barsun | H02S 20/30 126/696 |
| 8,402,703 B2 | 3/2013 | Brandt et al. | |
| 8,601,752 B2 | 12/2013 | Prentice | |
| 8,661,747 B2 * | 3/2014 | Eide | F24S 25/12 126/621 |
| 8,777,176 B2 * | 7/2014 | Genschorek | F24S 25/12 248/156 |
| 9,157,663 B2 | 10/2015 | Prentice | |
| 9,175,881 B2 * | 11/2015 | Schrock | F16B 7/182 |
| 9,425,731 B2 * | 8/2016 | Durney | F24S 25/65 |
| 9,628,018 B2 * | 4/2017 | Stapleton | H02S 20/22 |
| 10,250,181 B2 | 4/2019 | Vietas et al. | |
| 10,933,753 B2 * | 3/2021 | Gu | H02S 20/23 |
| 11,512,475 B2 * | 11/2022 | Jones | E04D 13/0762 |
| 11,606,060 B2 * | 3/2023 | Reynolds | H02S 30/10 |
| 11,689,147 B2 * | 6/2023 | Attal | F24S 25/12 52/173.3 |
| 11,689,150 B2 * | 6/2023 | Au | F16B 5/0621 136/246 |
| 11,824,491 B2 * | 11/2023 | Huang | F24S 25/65 |
| 2005/0252117 A1 | 11/2005 | Disterhof et al. | |

(Continued)

*Primary Examiner* — Christopher Garft
*Assistant Examiner* — Michael McDuffie
(74) *Attorney, Agent, or Firm* — Frijouf, Rust & Pyle, P.A.

(57) ABSTRACT

A solar panel support is disclosed for coupling a solar panel to a wall. The solar panel support includes a base having an upper surface and a lower surface. A first leg is coupled to the lower surface of the base. A second leg is coupled to the lower surface of the base. An upper leg surface is defined in the lower surface of the base between the first leg and the second leg. The first leg, the second leg and the upper leg surface define a base couple and a base channel. The base channel receives the wall for positioning the first leg adjacent to the first wall side, the second leg adjacent to the second wall side and positions the upper leg surface adjacent to the top wall surface. The base couple attaches the base with the wall and supporting the solar panel.

22 Claims, 10 Drawing Sheets

(56) References Cited

U.S. PATENT DOCUMENTS

| | | | |
|---|---|---|---|
| 2010/0000596 A1* | 1/2010 | Mackler | H01L 31/02 |
| | | | 136/246 |
| 2010/0206018 A1* | 8/2010 | Thorne | E05B 73/0005 |
| | | | 70/58 |
| 2010/0275975 A1* | 11/2010 | Monschke | F24S 25/12 |
| | | | 136/251 |
| 2010/0294343 A1* | 11/2010 | Wexler | F16M 13/02 |
| | | | 136/251 |
| 2011/0260027 A1 | 10/2011 | Farnham, Jr. | |
| 2016/0040373 A1* | 2/2016 | Zavitz | E21B 19/14 |
| | | | 52/294 |
| 2016/0165877 A1 | 6/2016 | Sosa, Jr. | |
| 2018/0131314 A1* | 5/2018 | Stearns | H02S 20/24 |
| 2020/0036325 A1* | 1/2020 | Poivet | H02S 30/20 |
| 2022/0021327 A1* | 1/2022 | Headley | H02S 20/23 |
| 2022/0149772 A1* | 5/2022 | Watson | F24S 30/425 |
| 2022/0337187 A1* | 10/2022 | Huang | H02S 30/00 |
| 2023/0012937 A1* | 1/2023 | Huzyak | F24S 25/65 |

* cited by examiner

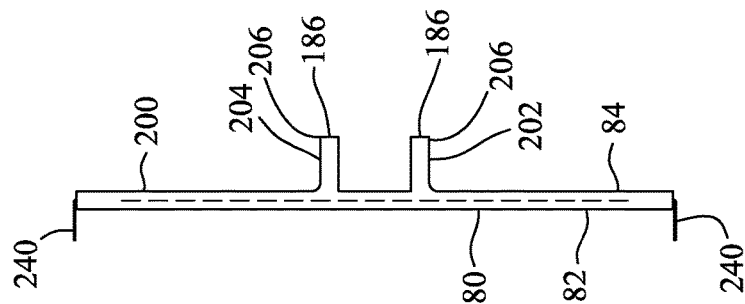
FIG. 9
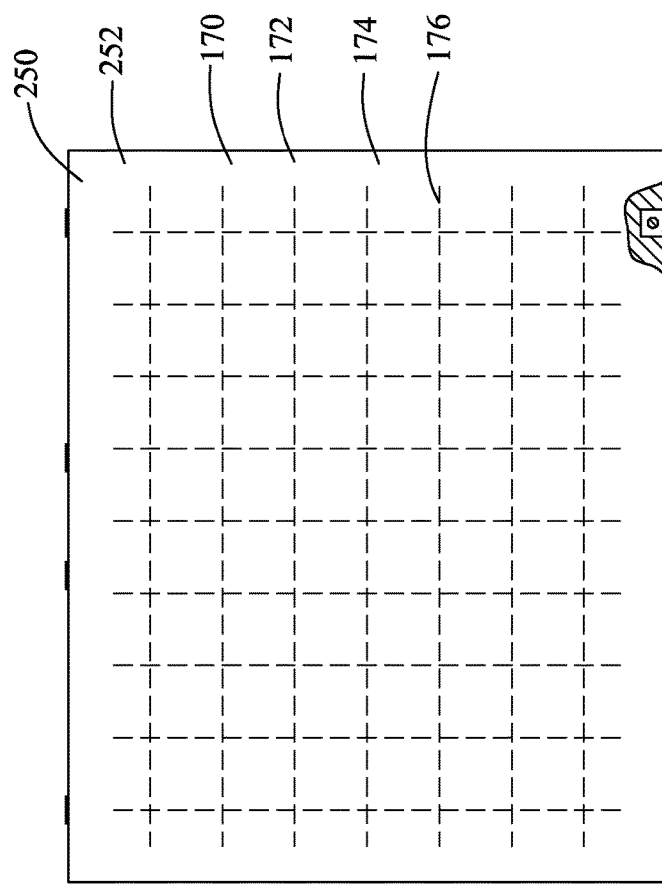
FIG. 6
FIG. 7
FIG. 8
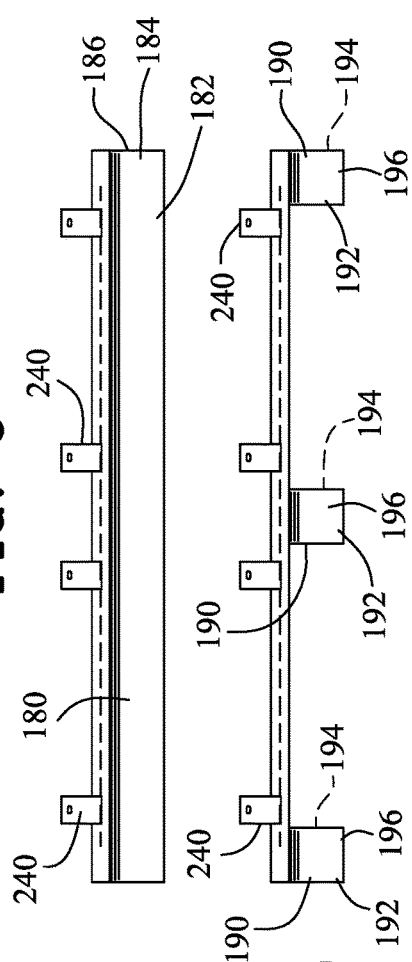

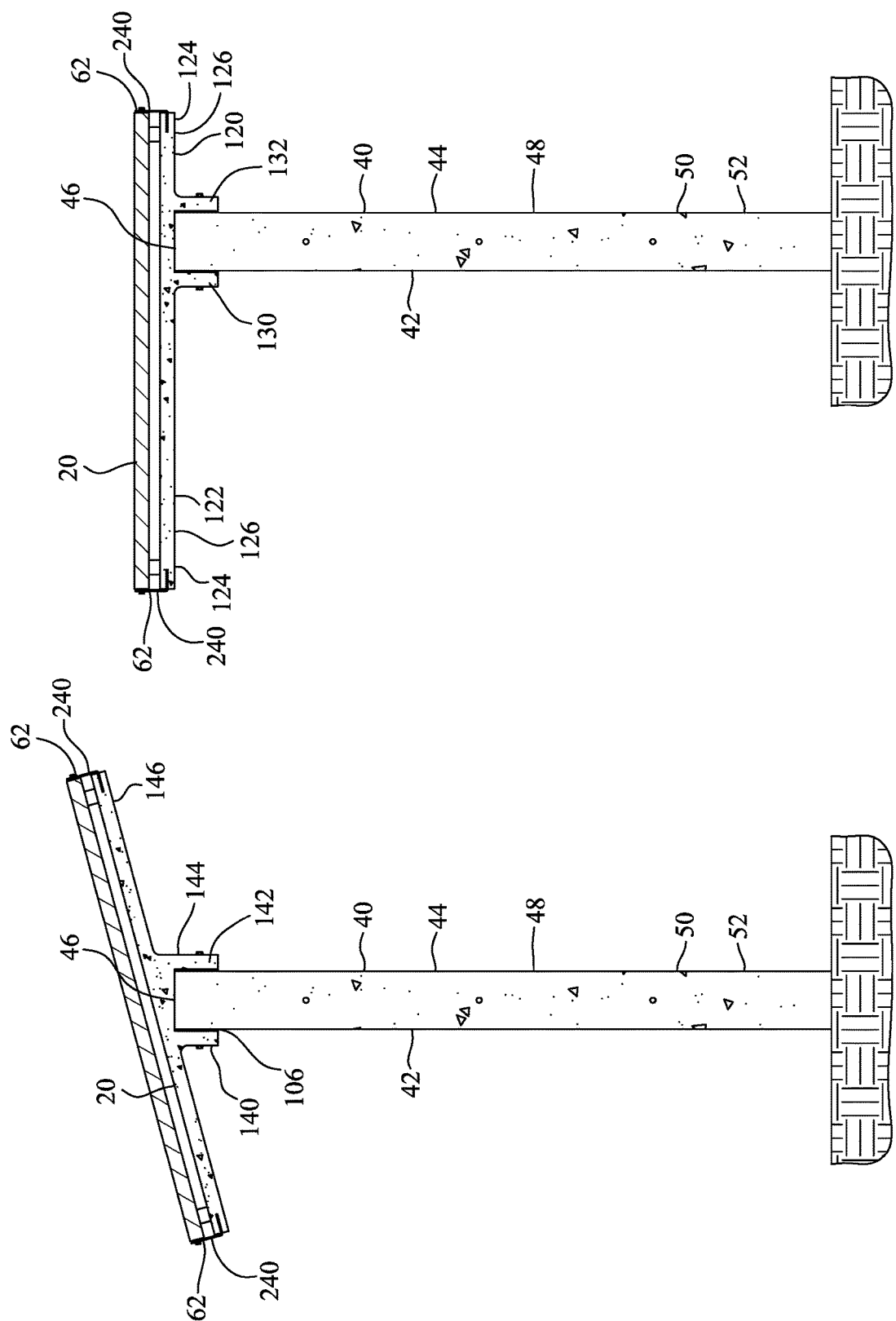

SOLAR PANEL SUPPORT

CROSS-REFERENCE TO RELATED APPLICATIONS

This application claims benefit of U.S. Patent Provisional Application No. 63/389,143 filed Jul. 14, 2022. All subject matter set forth in Provisional Application No. 63/389,143 is hereby incorporated by reference into the present application as if fully set forth herein.

BACKGROUND OF THE INVENTION

Field of the Invention

This invention relates to supports and more particularly to solar panel supports.

Background of the Invention

Much attention and awareness is growing over greenhouse emissions and how they are affecting the environment around the world. As such there is an effort to reduce greenhouse emissions and investigate alternative sources of energy. One source of energy that may significantly contribute to the generation of electrical power are photovoltaic cells or solar panels. In the past, photovoltaic cells were costly and not very efficient in the production of electrical energy. With the improvement in technology the cost of photovoltaic cells have decreased and the efficiency of electrical energy produced has increased. As a result, individuals and corporations may now purchase and install one or more photovoltaic cells to conserve electrical power and offset any electrical power required from the electrical utility system. Furthermore, individuals and corporations may install enough photovoltaic cells to generate a surplus of electrical power to put back into the electrical power grid.

One of the concerns with regard to photovoltaic cells is selecting a proper location for their securement. Preferably, the location would include a large area such that multiple photovoltaic cells may be utilized. In addition the location would preferably not impede the use or diminish the usable area of the property in which they are installed. One such location that photovoltaic cells are installed include the roof of structures. Although installing photovoltaic cells on roof structures may be advantageous, their installation may lead to roof leakage. In addition the number of photovoltaic cells that may be installed on roof structures may be diminished due to roof dimensions, protruding roof structures as well as limitations on building codes.

An alternative location is needed for positioning one or more photovoltaic cells. There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 7,018,063 to Michael et al. discloses a solar powered lighting assembly for attachment to an eaves trough mounted on an outer wall surface includes a lamp, a rechargeable power source, a solar panel assembly, a mounting bracket and a connector arm. The rechargeable power source is connected to the lamp to provide operational power. The solar panel assembly is coupled to the rechargeable power source to provide electrical power for recharging the rechargeable power source. The mounting bracket is coupled to the inside surface of the caves trough and is used to support the rechargeable power source and the solar panel assembly. The connector arm is coupled to the lamp and is adapted to be removeably coupled in between the eaves trough and the outer wall surface.

U.S. Pat. No. 8,402,703 to Brandt et al. discloses a mounting support for a photovoltaic module is described. The mounting support includes a foundation having an integrated wire-way ledge portion. A photovoltaic module support mechanism is coupled with the foundation.

U.S. Pat. No. 8,601,752 to Prentice discloses a solar panel cap and light cap can be secured to a wall or parapet through the use of a common bracket. The bracket includes two vertical extensions on either side of a locking channel. The locking channel is configured to permanently receive a matching end, such that the matching end cannot come out of the locking channel once installed. Both the solar panel cap and light cap include the matching end. The solar panel caps and light caps are configured to connect to an adjacent cap such that they are electrically coupled. Either the solar panel caps or light caps can include a rechargeable battery such that energy stored during daylight hours can be used during the night.

U.S. Pat. No. 9,157,663 to Prentice discloses a solar panel cap and light cap secured to a wall or parapet through the use of a fixed coping having two vertical supports on either side of a locking channel. The vertical supports are biased or resilient to secure the coping to the top of the parapet or wall. The locking channel is configured to slidably receive a locking insert from a solar panel cap or light cap, each configured to connect to an adjacent cap such that they are electrically coupled. The solar panel caps include a horizontal base and an angled solar panel pivotally attached on one edge to the horizontal base. Support plates are pivotally attached to opposite edges of both the horizontal base and the angled solar panel such that when they overlap and are secured to one another the angled solar panel is adjustably positionable relative to the horizontal base.

U.S. Pat. No. 10,250,181 to Vietas et al. discloses a support device for supporting a solar panel above a base surface includes a body having an upper mounting surface, a lower base surface, and integral ballast. The upper mounting surface is sloped relative to the lower base surface. The support device further includes at least one mounting element projecting upwardly from the upper mounting surface and configured to support a solar panel. A solar panel support system includes first and second support devices spaced apart from one another, each including a body having an upper mounting surface, a lower base surface, and integral ballast, the upper mounting surface being sloped relative to the lower base surface. Each support device further includes first and second mounting elements projecting upwardly from the upper mounting surface and configured to support solar panels. First and second purlins are supported by and extend between the first and second support devices, and are configured to support the solar panels.

United States Patent Application 2005/0252117 to Disterhof et al. discloses a basement wall is provided which includes a precast prestressed hollow core concrete panel. The panel has a plurality of horizontally extending voids and a plurality of horizontally extending tension cables. The panel has a lower portion extending below grade. The panel preferably has a layer of wire mesh positioned between the voids and the inner surface or between the voids and the outer surface. An end cap for the panel is also provided. The panel can have an impressed brick pattern on the above-grade outer surface and the panel can have a window opening, a brick ledge and/or a beam pocket.

United States Patent Application 2011/0260027 to Farnham, Jr. discloses a solar panel mounting assembly including a bracket having a base, a central member extending from the base defining a channel opening in a direction away from the base, and first and second coplanar rails carried on the central member and spaced apart from the base, and a locking cap that lockingly engages within the channel including first and second spaced legs and a head that overhangs a portion of each of the first and second rails. A solar panel mounting system including a solar panel, bracket and locking cap.

United States Patent Application 2016/0165877 to Sosa, Jr. discloses a wall cap that can be positioned on the upper end of a wall so as to prevent animals from climbing over the wall. The wall cap includes an elongated cover composed of a rigid material having a smooth outer surface. The elongated cover preferably includes a triangular cross sectional area so that the elongated cover forms a pointed upper end and slopes downwardly towards the front and rear sides thereof. The front and rear sides of the elongated cover each include a flange thereon, wherein the flanges can be positioned on opposing sides of the wall so as to secure the wall cap on the wall. The wall cap is secured to the wall using any suitable fastening method, such as by use of caulking or adhesives, among others.

Although the aforementioned prior art have contributed to the development of the art of solar panel supports, none of these prior art patents have solved the needs of this art.

Therefore, it is an object of the present invention to provide an improved solar panel support.

Another object of this invention is to provide an improved solar panel support which may be installed on the top of a wall.

Another object of this invention is to provide an improved solar panel support wherein multiple solar panels may be installed lengthwise along the top of the wall.

Another object of this invention is to provide an improved solar panel support that may be easily installed on the top of the wall.

Another object of this invention is to provide an improved solar panel support that may further serve as a wall cap.

Another object of this invention is to provide an improved solar panel support which may be constructed of precast concrete.

Another object of this invention is to provide an improved solar panel support which may have a horizontal orientation and angular orientation or and offset orientation relative to the wall.

Another object of this invention is to provide an improved solar panel support which may contribute to the structural integrity of the wall.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a solar panel support for coupling a solar panel to a wall. The wall has a first wall side, a second wall side and a top wall surface, the wall has a wall thickness. A panel couple secures the solar panel to the solar panel support. The solar panel support includes a base having an upper surface, a lower surface, a first side surface, a second side surface, a third side surface and a fourth side surface. A first leg is coupled to the lower surface of the base. A second leg is coupled to the lower surface of the base. An upper leg surface is defined in the lower surface of the base between the first leg and the second leg. The first leg, the second leg and the upper leg surface defines a base couple and a base channel. The base channel receives the wall for positioning the first leg adjacent to the first wall side, the second leg adjacent to the second wall side and positioning the upper leg surface adjacent to the top wall. The base couple attaches the base with the wall and supporting the solar panel.

In one embodiment of the invention, the first leg and the first side surface of the base defines a first base length there between. The second leg and the second side surface of the base defines a second base length there between. The first base length is equivalent to the second base length for defining a centered orientation of the base relative to the wall for extending the base equidistant from first wall side and the second wall side of the wall.

In another embodiment of the invention, the first leg and the first side surface of the base defines a first base length there between. The second leg and the second side surface of the base defines a second base length there between. The first base length is non-equivalent to the second base length for defining a non-centered orientation of the base relative to the wall for extending the base non-equidistant from first wall side and the second wall side of the wall.

In another embodiment of the invention, the first leg and the base define a first perpendicular orientation. The second leg and the base define a second perpendicular orientation. The first perpendicular orientation and the second perpendicular orientation position the base in a base perpendicular orientation relative to the wall.

In another embodiment of the invention, the first leg and the base define a first non-perpendicular orientation. The second leg and the base define a second non-perpendicular orientation. The first non-perpendicular orientation and the second non-perpendicular orientation position the base in a base non-perpendicular orientation relative to the wall.

In another embodiment of the invention, the base, the first leg and the second leg define an integral one piece unit. The integral one piece unit is constructed of precast concrete.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 6 is a top view of the solar panel support without a solar panel;

FIG. 7 is a front view of FIG. 6 illustrating an equidistant width length between a base and a first and a second leg;

FIG. 8 is a front view of FIG. 6 illustrating a non-equidistant width length between the base and the first and the second leg;

FIG. 9 is a right side view of FIG. 6;

FIG. 13 is a view similar to FIG. 4 illustrating the base having a non-perpendicular orientation relative to the wall;

FIG. 14 is a view similar to FIG. 4 illustrating the first leg and the second leg having a non-centered orientation relative to the base;

Similar reference characters refer to similar parts throughout the several Figures of the drawings.

DETAILED DISCUSSION

Figure 1:
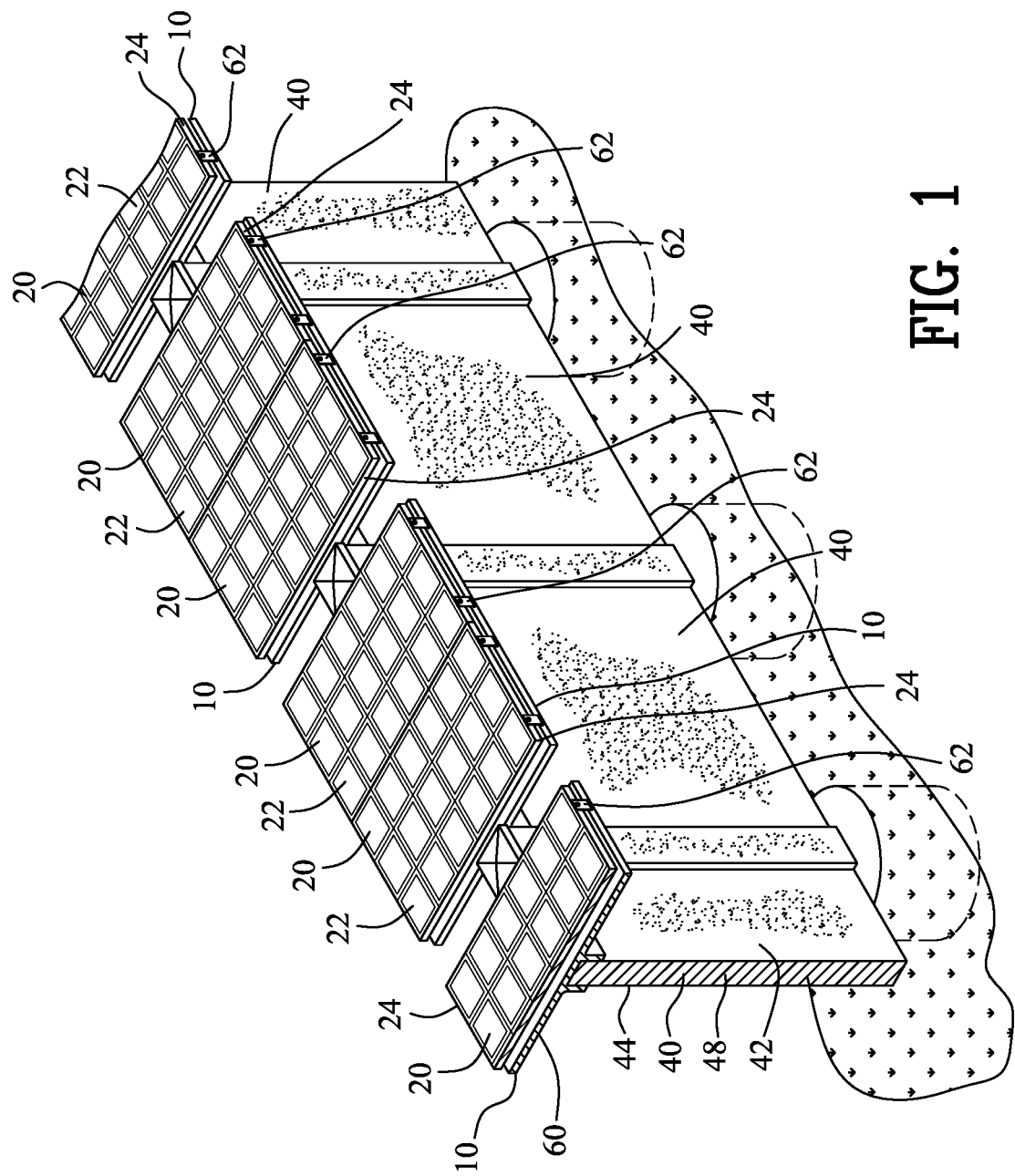
FIG. 1 is a top front isometric view of a solar panel support coupling a solar panel to a wall incorporating the present invention.
Figure 2:
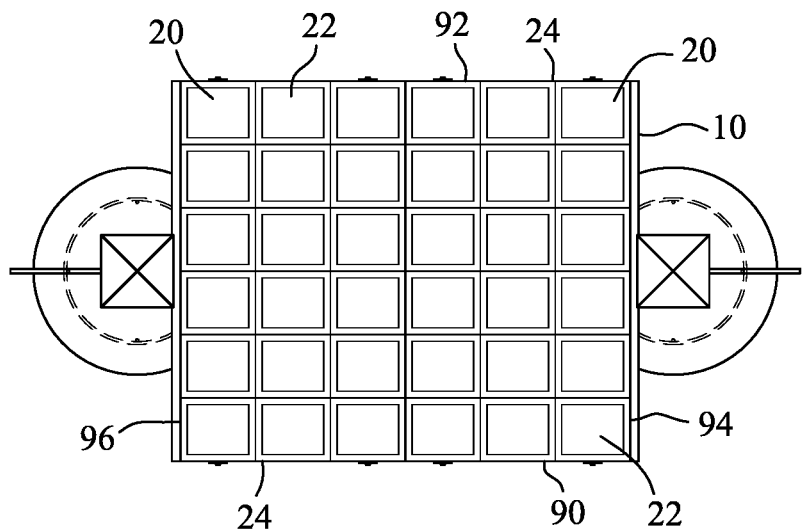
FIG. 2 is a top view of FIG. 1.
Figure 3:
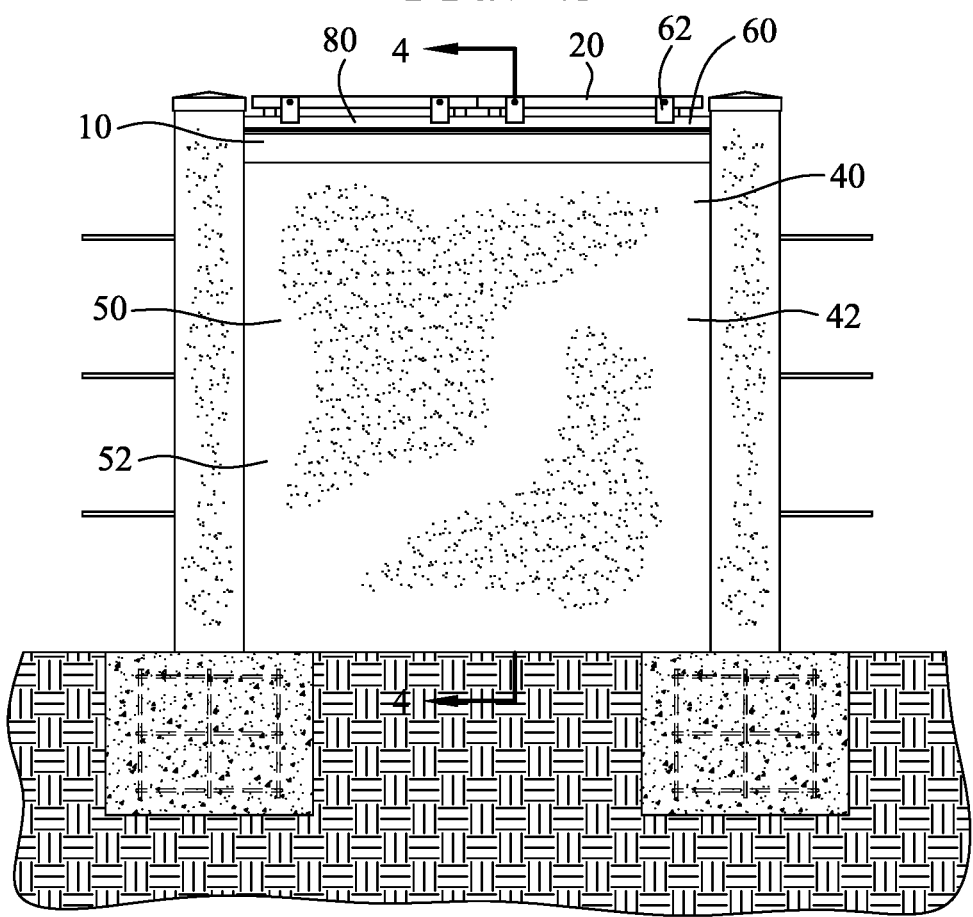
FIG. 3 is a front view of FIG. 1.
Figure 4:
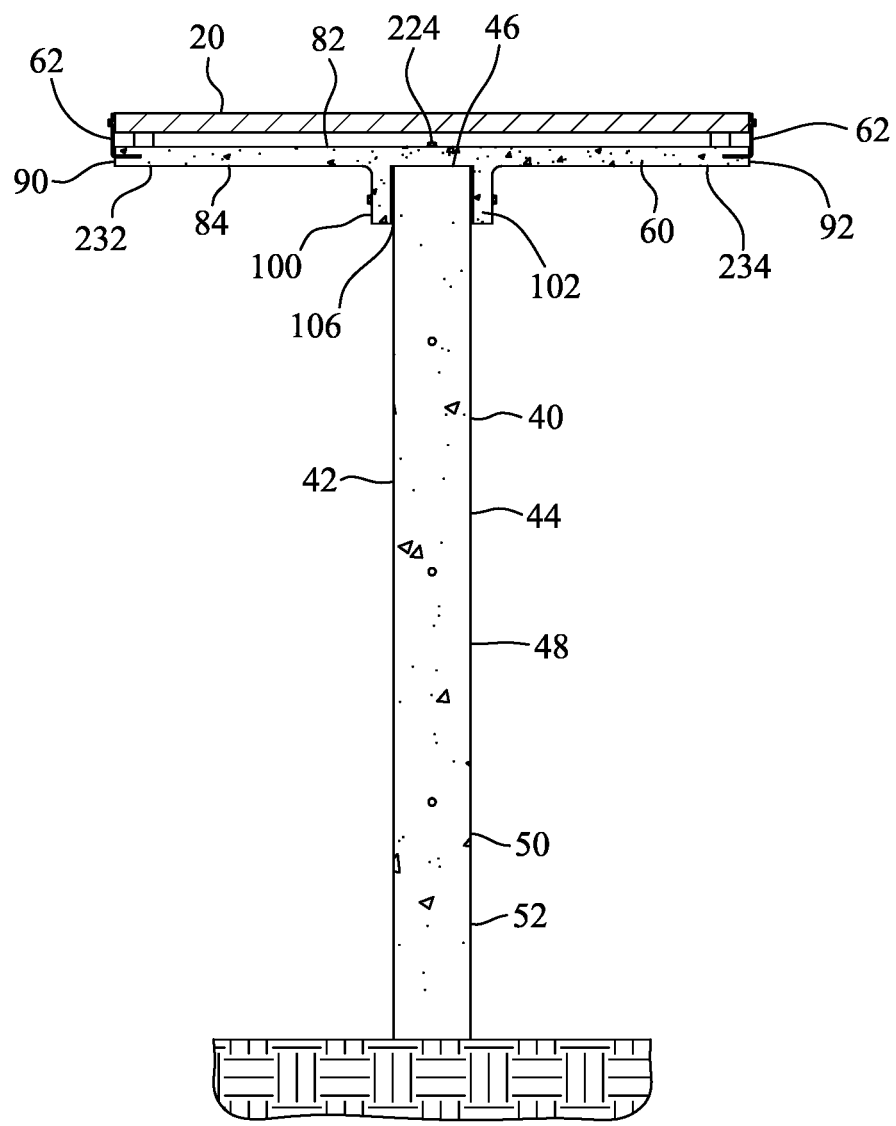
FIG. 4 is a sectional view along line 4-4 in FIG. 3.

FIGS. 1-16 are various views of a solar panel support 10 incorporating the subject invention. The solar panel support 10 couples a solar panel 20 to a wall 40. The solar panel 20 includes a plurality of photovoltaic cells 22. A panel frame 24 may encircle the plurality of photovoltaic cells 22. The photovoltaic cells 22 provide an electrical current.

The wall 40 has a first wall side 42, a second wall side 44 and a top wall surface 46. The wall has a wall thickness 48. The wall 40 may include a masonry wall 50 constructed from a plurality of cement bricks and mortar. The wall 40 may further be constructed from a formed poured concrete wall. Alternatively, the wall 40 may be constructed from wood, steel, polyvinyl chloride (PVC) or other building materials 52.

A panel couple 60 secures the solar panel 20 to the solar panel support 10. The panel couple 60 may include solar panel mounting brackets 62. The panel couple 60 may alternatively include screws, bolts, nails, fasteners, adhesive, hook and loop or other securing devices.

The solar panel support 10 includes a base 80 having an upper surface 82, a lower surface 84, a first side surface 90, a second side surface 92, a third side surface 94 and a fourth side surface 96. A first leg 100 is coupled to the lower surface 84 of the base 80. A second leg 102 is coupled to the lower surface 84 of the base 80. An upper leg surface 104 is defined in the lower surface 84 of the base 80 between the first leg 100 and the second leg 102. The first leg 100, the second leg 102 and the upper leg surface 104 define a base couple 108 and a base channel 109. More specifically, the first leg 100, the second leg 102 and the upper leg surface 104 define a C-shape mounting frame 106.

The C-shaped mount frame 106 is positioned onto the wall 60. The base channel 109 receives the wall 40 for positioning the first leg 100 adjacent to the first wall side 42, the second leg 102 adjacent to the second wall side 44 and positioning the upper leg surface 104 adjacent to the top wall surface 46. The base couple 108 attaches the base 80 with the wall 40 and supports the solar panel 20.

In one embodiment of the subject invention as shown in FIGS. 4, 5, 9, 13, 15 and 16, the first leg 100 and the first side surface 90 of the base 80 define a first base length 110 there between. The second leg 102 and the second side surface 92 of the base 80 define a second base length 112 there between. The first base length 110 is equivalent to the second base length 112 for defining a centered orientation 114 of the base 80 relative to the wall 40 for extending the base 80 equidistant 116 from first wall side 42 and the second wall side 44 of the wall 40.

In another embodiment of the subject invention as shown in FIG. 14, the first leg 100 and the first side surface 90 of the base 80 define a first base length 120 there between. The second leg 102 and the second side surface 92 of the base 80 define a second base length 122 there between. The first base length 120 is non-equivalent to the second base length 122 for defining a non-centered orientation 124 of the base 80 relative to the wall 40 for extending the base 80 non-equidistant 126 from first wall side 42 and the second wall side 44 of the wall 40. The non-centered orientation 124 may be utilized wherein there is a restrictive clearance on one side of the wall as compared to the other side of the wall. This restrictive clearance may be due to a physical obstruction, property line or other restrictions. Furthermore, the non-centered orientation 124 may be utilized for providing an added shaded area under the increased length side of the base 80.

In one embodiment of the subject invention as shown in FIGS. 4, 5, 9, 13, 14, 15 and 16, the first leg 100 and the base 80 define a first perpendicular orientation 130. The second leg 102 and the base 80 define a second perpendicular orientation 132. The first perpendicular orientation 130 and the second perpendicular orientation 132 position the base 80 in a base perpendicular orientation 134 relative to the wall 40. More specifically, the first perpendicular orientation 130 and the second perpendicular orientation 132 position the base 80 in a horizontal position 136. The horizontal position 136 may expose the solar panels 20 to more continuous sun light depending on location of solar panels 20 and objects surrounding the solar panels 20.

In one embodiment of the subject invention as shown in FIGS. 13, the first leg 100 and the base 80 define a first non-perpendicular orientation 140. The second leg 102 and the base 80 define a second non-perpendicular orientation 142. The first non-perpendicular orientation 140 and the second non-perpendicular orientation 142 position the base 80 in a base non-perpendicular orientation 144 relative to the wall 40. More specifically, the first non-perpendicular orientation 140 and the second non-perpendicular orientation 142 position the base 80 in a non-horizontal position or angled position 146. The non-horizontal position 146 may expose the solar panels 20 to more continuous sun light depending on location of solar panels 20 and objects surrounding the solar panels 20. The non-horizontal position 146 may further prevent debris from gathering on the solar panel 20 and prevent the accumulation of dirt on the solar panel 20.

Figures 10, 11, 12:
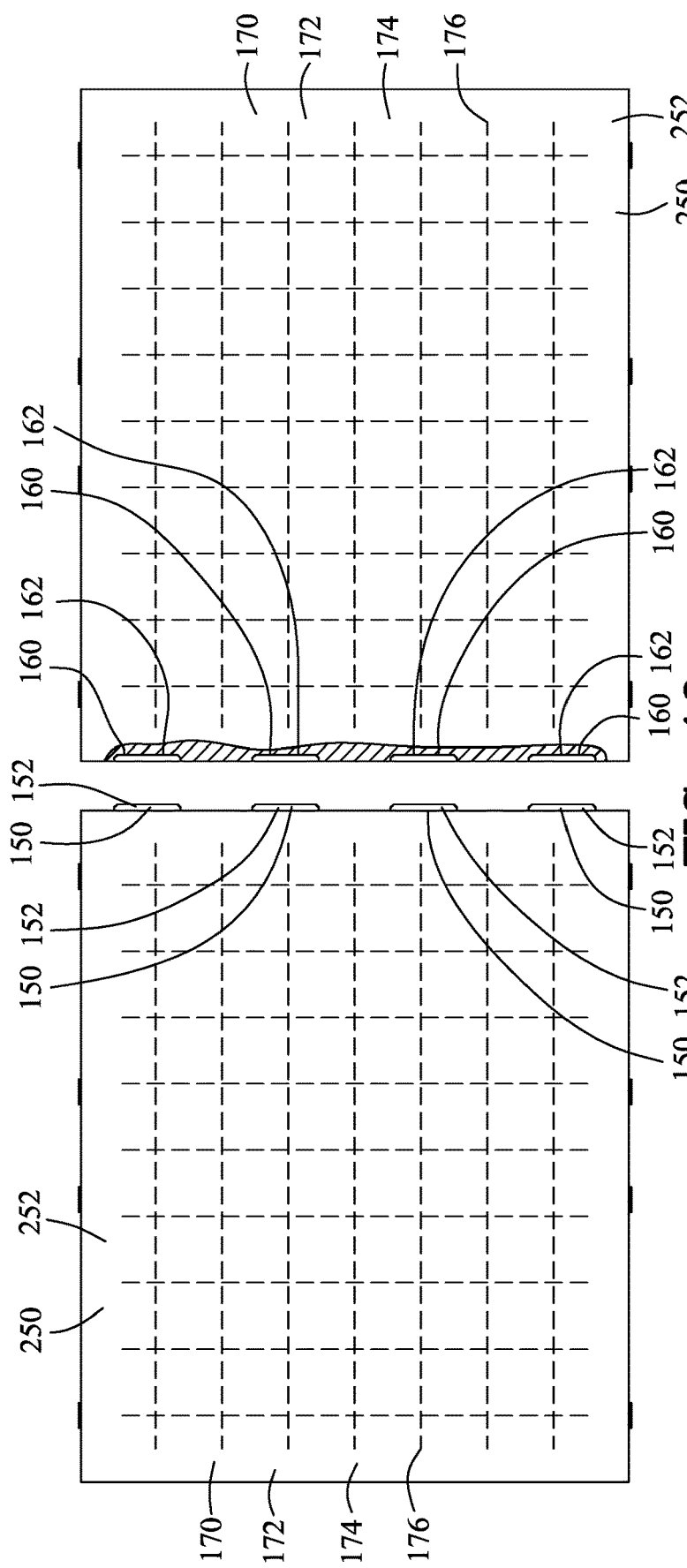
FIG. 10 is a top view of a first solar panel support having a primary key and a second solar panel support having a secondary key.
FIG. 11 is a front view of FIG. 10.
FIG. 12 is a view similar to FIG. 11 illustrating the primary key engaging with the secondary key.
Figure 15:
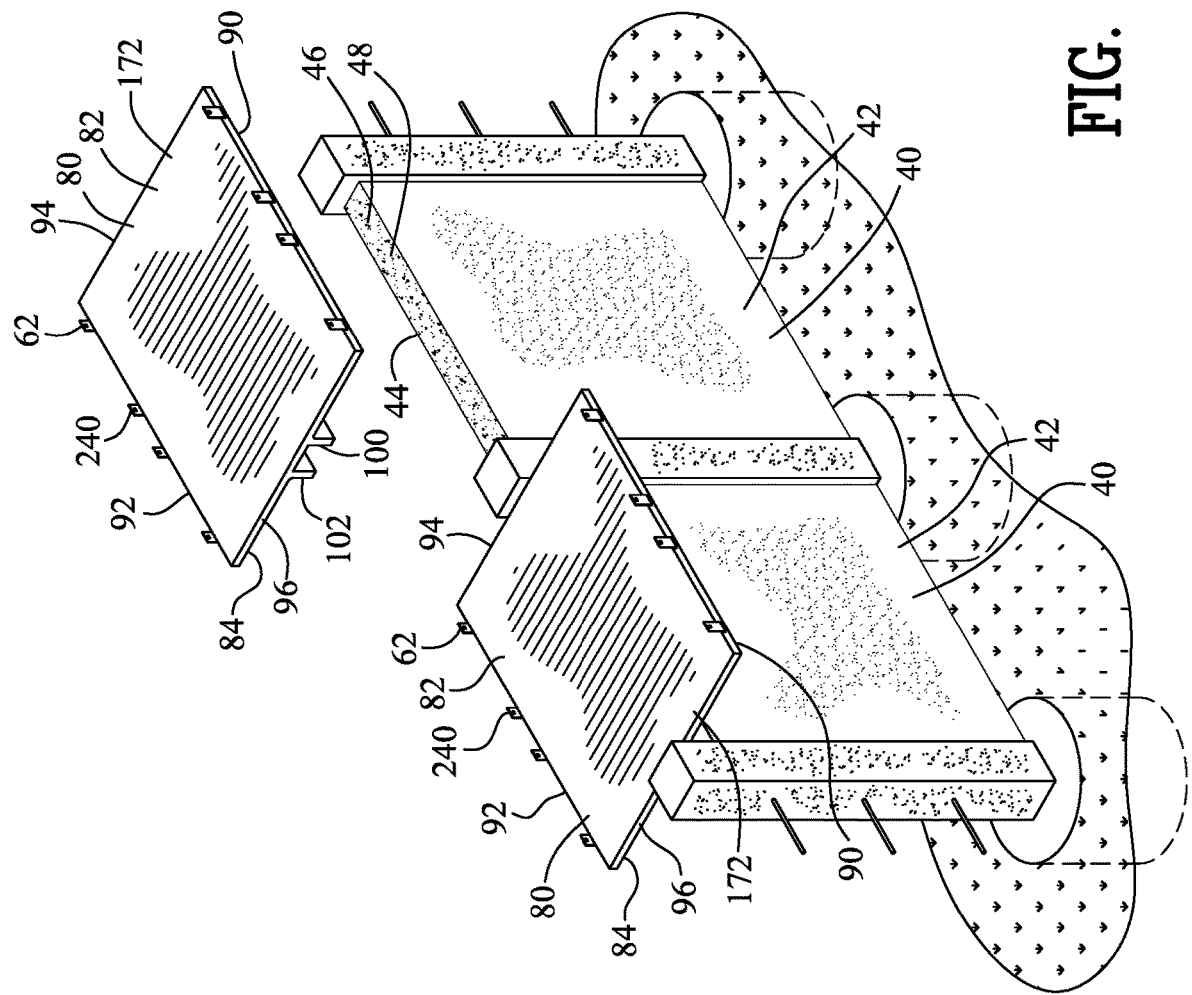
FIG. 15 is a view similar to FIG. 1 illustrating solar panel supports being positioned on to the wall.
Figure 16:
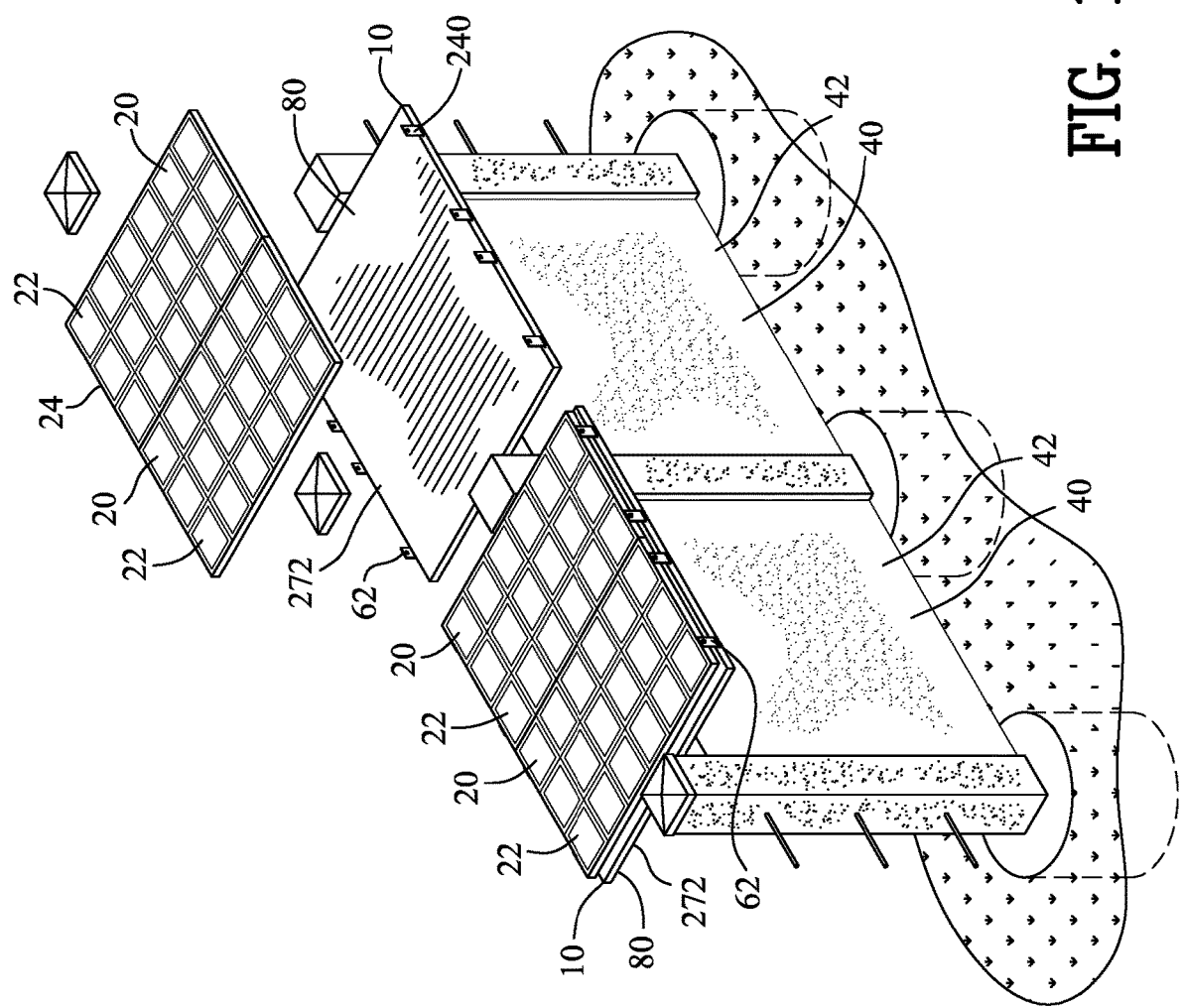
FIG. 16 is a view similar to FIG. 15 illustrating solar panels being positioned on the solar panel supports.

As shown in FIGS. 10-12, the base 80 may include a primary key 150 coupled to the third side surface 94 of the base 80. A secondary key 160 is coupled to the fourth side surface 96 of the base 80. The primary key 150 engages with the secondary key 160 for securing multiple bases 80 together when attaching the multiple bases 80 with the wall 40 and defining a base interlock 154. More specifically, the primary key 150 engages with the secondary key 160 for securing and linking multiple bases 80 end to end. In addition, multiple primary keys 150 and multiple secondary keys 160 may be positioned on the third side surface 94 and the fourth side surface 96 respectively. The primary key 150 and the secondary key 160 may prevent the rotational displacement of a first base 80 relative to a second base 80 where placed end to end.

The primary key 150 may include a protrude element 152 extending from the third side surface 94 of the base 80 and exterior of the base 80. The secondary key 160 may include a recess element 162 recessed from the fourth side surface 96 of the base 80 and into the base 80. The protrude element 152 engages within the recess element 162 for securing multiple the bases 80 together when attaching the multiple bases 80 with the wall 40 and defining a male and female base interlock 156. The protrude element 152 and the recess element 162 may include cylindrical shape, square shape, rectangular shape, pyramid shape, elliptical shape or other geometric shapes. The primary key 150 and the secondary key 160 may also include screws, bolts, nails, fasteners, adhesive, hook and loop or other securing devices.

Preferably, the base 80, the first leg 100 and the second leg 102 defining an integral one piece unit 170. The integral one piece unit 170 may be constructed of precast concrete 172. A fibrous material 174 may be added to the precast concrete for increases structural integrity of the precast concrete 172. The fibrous material 174 may include steel fibers, glass fibers, synthetic fibers and natural fibers. In addition, a rebar structure 176 may be within the precast concrete 172 for increasing the structural integrity of the precast concrete 172. Alternately, the integral one piece unit 170 may be constructed from steel, aluminum, carbon fiber, plastic, resin, wood or other rigid materials.

As best shown in FIG. 7, the base 80 defines a base width length 180. The first leg 100 defines a first leg width length 182. The second leg 102 defines a second leg width length 184. The base width length 180, the first leg width length 182 and the second leg width length 184 may define an equidistant width length 186 for extending the first leg 100 and the second leg 102 the entire width of the base 80.

Alternatively, as best shown in FIG. 8, the base 80 defines a base width length 190. The first leg 100 defines a first leg width length 192. The second leg 102 defines a second leg width length 194. The base width length 190 may be greater than the first leg width length 192 and the second leg width length 194 for defining a non-equidistant width length 196 and reducing the width of the first leg 100 and the second leg 102 relative to the base 80. The non-equidistant width length 196 may serve to reduce the volume and the weight of the solar panel support 10. Multiple first legs 100 and multiple second legs 102 may extend from the lower surface 84 of the base 80. As such, the solar panel support 10 may be manufactured with a reduction in building materials.

The base 80 defines a base depth length 200. The first leg 100 defines a first leg height 202. The second leg 102 defines a second leg height 204. The base depth length 200 may define a 1 to 5 ratio 206 to the first leg height 202 and the second leg height 204.

Figure 5:
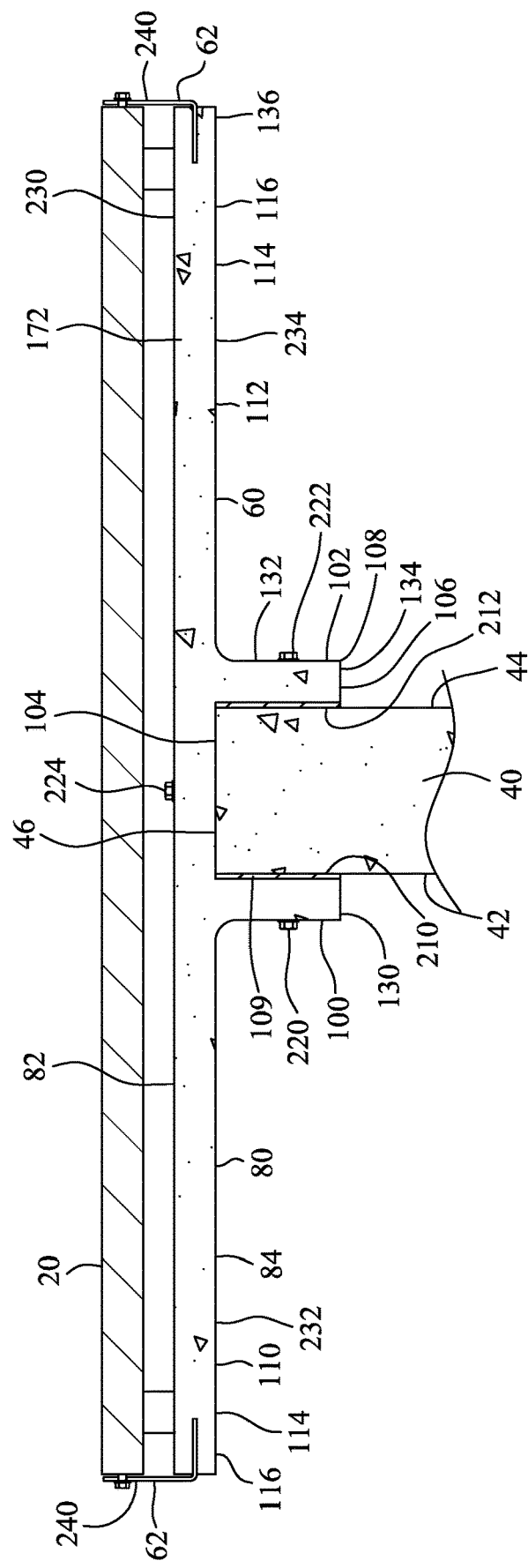
FIG. 5 is an enlarged portion of FIG. 4.

As best shown in FIG. 5, a first spacer member 210 may be positioned between the first leg 100 and the first wall side 42. A second spacer member may be positioned between the second leg 102 and the second wall side 44. The first spacer member 210 and the second spacer member 212 frictionally engage the base couple 108 with the wall 40. The first spacer member 210 and or the second spacer member 212 may be utilized wherein the distance between the first leg 100 and the second leg 102 is larger than the wall thickness 48. The first spacer member 210 and the second spacer member 212 may be constructed from steel, aluminum, carbon fiber, plastic, resin, wood, rubber, closed cell panels, foam panels, expanding foam, wedged shims or other rigid or semi-rigid materials.

A first fastener 220 may traverse the first leg 100 and engage into the wall 40. A second fastener 222 may traverse the second leg 102 and engage into the wall 40. A third fastener 224 may traverse the base 80 engage into the wall 40. The first fastener 220, the second fastener 222 and the third fastener 224 may further couple the base 80 with the wall 40. The first fastener 220, the second fastener 222 and the third fastener 224 may include screws, bolts, rivets, nails, adhesive, sealant, expanding foam, wedged shims or other securing devices.

The base 80 may defines a wall cap 230 for covering the top wall surface 46 and protecting the wall 40. The wall cap 230 may protect the wall 40 from precipitation, debris, weathering, ultraviolet radiation and other eroding factors. The wall 230 further provides a first shade cover 232 above the first wall side 42 and a second shade cover 234 above the second wall side 44.

As shown in FIGS. 1-16, the panel couple 60 may be secured within the precast concrete 172. More specifically, the panel couple 60 may be positioned within a precast form and thereafter concrete is poured into the precast form and cured. After curing of the concrete, a portion of the panel couple 60 is encapsulated within the concrete. Alternatively, anchoring sleeves, threaded bores, protruding threaded bolts may be positioned within the precast form and thereinafter concrete is poured for defining the panel couple 60. In this embodiment the panel couple 60 defines a precast concrete panel couple 240.

As shown in FIGS. 10-12, the base 80, the first leg 100, the second leg 102, the primary key 150 and the secondary key 160 may define an integral one piece unit 250. More specifically, the integral one piece unit 250 may be constructed of precast concrete 252. As described above, the primary key 150 engages with the secondary key 160 for securing multiple bases 80 together when attaching the multiple bases 80 end to end atop of the wall 40.

Figure 17:
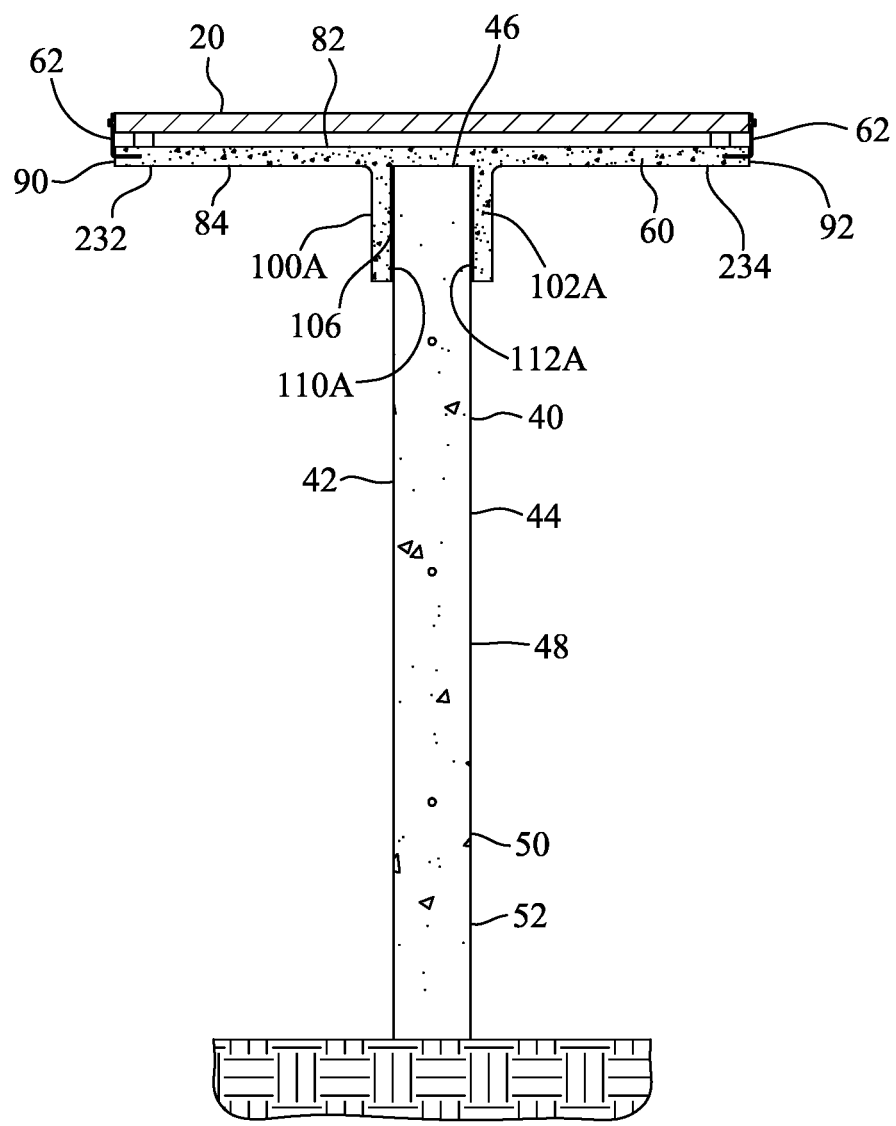
FIG. 17 is a view similar to FIG. 4 illustrating an elongated leg and a second elongated leg positioned adjacent to the wall.

FIG. 17 illustrates another embodiment of the invention wherein the solar panel support 10 includes an elongated first leg 100A and an elongated second leg 102A. The elongated first leg 100A and the elongated second leg 102A may be utilized to more securely mount the solar panel support 10 to the wall 40. Furthermore, the use of the elongated first leg 100A and the elongated second leg 102A may lessen the need or the use entirely of the first fastener 220, the second fastener 222 and the third fastener 224.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A solar panel support for coupling a solar panel to a wall, the wall having a first wall side, a second wall side and a top wall surface, the wall having a wall thickness, a panel couple for securing the solar panel to the solar panel support, the solar panel support, comprising:
    a base having an upper surface, a lower surface, a first side surface, a second side surface, a third side surface and a fourth side surface;
    a first leg coupled to said lower surface of said base;
    a second leg coupled to said lower surface of said base;
    an upper leg surface defined in said lower surface of said base between said first leg and said second leg;
    said first leg, said second leg and said upper leg surface defining a base couple and a base channel;
    said base channel receiving the wall for positioning said first leg adjacent to the first wall side, said second leg adjacent to the second wall side and positioning said upper leg surface adjacent to the top wall surface;
    said base couple attaching said base with the wall and supporting the solar panel;
    said base, said first leg and said second leg defined an integral one piece unit; and
    said integral one piece unit is constructed of precast concrete.

2. The solar panel support as set forth in claim 1, wherein said first leg and said first side surface of said base define a first base length there between;
    said second leg and said second side surface of said base define a second base length there between; and
    said first base length equivalent to said second base length for defining a centered orientation of said base relative to the wall for extending said base equidistant from first wall side and the second wall side of the wall.

3. The solar panel support as set forth in claim 1, wherein said first leg and said first side surface of said base define a first base length there between;
    said second leg and said second side surface of said base define a second base length there between; and
    said first base length non-equivalent to said second base length for defining a non-centered orientation of said base relative to the wall for extending said base non-equidistant from first wall side and the second wall side of the wall.

4. The solar panel support as set forth in claim 1, wherein said first leg and said base define a first perpendicular orientation;
    said second leg and said base define a second perpendicular orientation; and
    said first perpendicular orientation and said second perpendicular orientation positioning said base in a base perpendicular orientation relative to the wall.

5. The solar panel support as set forth in claim 1, wherein said first leg and said base define a first non-perpendicular orientation;
    said second leg and said base define a second non-perpendicular orientation; and
    said first non-perpendicular orientation and said second non-perpendicular orientation positioning said base in a base non-perpendicular orientation relative to the wall.

6. The solar panel support as set forth in claim 1, further including a primary key coupled to said third side surface of said base;
    a secondary key coupled to said fourth side surface of said base; and
    said primary key engaging with said secondary key for securing multiple said bases together when attaching said multiple bases with the wall and defining a base interlock.

7. The solar panel support as set forth in claim 6, wherein said primary key includes a protrude element extending from said third side surface of said base and exterior of said base;
    said secondary key includes a recess element recessed from said fourth side surface of said base and into said base; and
    said protrude element engaging within said recess element for securing multiple said bases together when attaching said multiple bases with the wall and defining a male and female base interlock.

8. The solar panel support as set forth in claim 1, wherein said base, said first leg and said second leg defining an integral one piece unit.

9. The solar panel support as set forth in claim 1, further including a fibrous material for increases structural integrity of said precast concrete.

10. The solar panel support as set forth in claim 1, further including a rebar structure for increases structural integrity of said precast concrete.

11. The solar panel support as set forth in claim 1, wherein said base defines a base width length;
    said first leg defines a first leg width length;
    said second leg defines a second leg width length; and
    said base width length, said first leg width length and said second leg width length defining an equidistant width length for extending said first leg and said second leg the entire width of said base.

12. The solar panel support as set forth in claim 1, wherein said base defines a base width length;
    said first leg defines a first leg width length;
    said second leg defines a second leg width length; and
    said base width length being greater than said first leg width length and said second leg width length for defining a non-equidistant width length and reducing the width of said first leg and said second leg relative to said base.

13. The solar panel support as set forth in claim 1, wherein said base defines a base depth length;
    said first leg defines a first leg height;
    said second leg defines a second leg height; and
    said base depth length defining a 1 to 5 ratio to said first leg height and said second leg height.

14. The solar panel support as set forth in claim 1, further including a first spacer member positioned between said first leg and the first wall side;
    a second spacer member positioned between said second leg and the second wall side; and
    said first spacer member and said second spacer member frictionally engaging said base couple with the wall.

15. The solar panel support as set forth in claim 1, further including a first fastener traversing said first leg and engaging into the wall;
    a second fastener traversing said second leg and engaging into the wall; and
    said first fastener and said second fastener coupling said base with the wall.

16. The solar panel support as set forth in claim 1, wherein said base defines a wall cap for covering the top wall surface and protecting the wall.

17. A solar panel support for coupling a solar panel to a wall, the wall having a first wall side, a second wall side and a top wall surface, the wall having a wall thickness, the solar panel support, comprising:
- a base having an upper surface, a lower surface, a first side surface, a second side surface, a third side surface and a fourth side surface;
- a first leg coupled to said lower surface of said base;
- a second leg coupled to said lower surface of said base;
- an upper leg surface defined in said lower surface of said base between said first leg and said second leg;
- said first leg, said second leg and said upper leg surface defining a base couple and a base channel;
- said base channel receiving the wall for positioning said first leg adjacent to the first wall side, said second leg adjacent to the second wall side and positioning said upper leg surface adjacent to the top wall surface;
- said base couple attaching said base with the wall and supporting the solar panel;
- said base, said first leg and said second leg defining an integral one piece unit;
- said integral one piece unit is constructed of precast concrete;
- a panel couple for securing the solar panel to the base; and
- said panel couple secured within said precast concrete.

18. The solar panel support as set forth in claim 17, wherein said panel couple is a precast concrete panel couple.

19. A solar panel support for coupling a solar panel to a wall, the wall having a first wall side, a second wall side and a top wall surface, the wall having a wall thickness, a panel couple for securing the solar panel to the solar panel support, the solar panel support, comprising:
- a base having an upper surface, a lower surface, a first side surface, a second side surface, a third side surface and a fourth side surface;
- a first leg coupled to said lower surface of said base;
- a second leg coupled to said lower surface of said base;
- an upper leg surface defined in said lower surface of said base between said first leg and said second leg;
- said first leg, said second leg and said upper leg surface defining a base couple and a base channel;
- said base channel receiving the wall for positioning said first leg adjacent to the first wall side, said second leg adjacent to the second wall side and positioning said upper leg surface adjacent to the top wall surface;
- said base couple attaching said base with the wall and supporting the solar panel;
- a primary key coupled to said third side surface of said base;
- a secondary key coupled to said fourth side surface of said base;
- said primary key engaging with said secondary key for securing multiple said bases together when attaching said multiple bases with the wall;
- said base, said first leg, said second leg, said primary key and said secondary key defining an integral one piece unit; and
- said integral one piece unit is constructed of precast concrete.

20. A solar panel support for coupling a solar panel to a wall, the wall having a first wall side, a second wall side and a top wall surface, the wall having a wall thickness, a panel couple for securing the solar panel to the solar panel support, the solar panel support, comprising:
- a base having an upper surface, a lower surface, a first side surface, a second side surface, a third side surface and a fourth side surface;
- a first leg coupled to said lower surface of said base;
- a second leg coupled to said lower surface of said base;
- an upper leg surface defined in said lower surface of said base between said first leg and said second leg;
- said first leg, said second leg and said upper leg surface defining a base couple and a base channel;
- said base channel receiving the wall for positioning said first leg adjacent to the first wall side, said second leg adjacent to the second wall side and positioning said upper leg surface adjacent to the top wall surface;
- said base couple attaching said base with the wall and supporting the solar panel;
- a primary key coupled to said third side surface of said base;
- a secondary key coupled to said fourth side surface of said base; and
- said primary key engaging with said secondary key for securing multiple said bases together when attaching said multiple bases with the wall and defining a base interlock.

21. A solar panel support for coupling a solar panel to a wall, the wall having a first wall side, a second wall side and a top wall surface, the wall having a wall thickness, a panel couple for securing the solar panel to the solar panel support, the solar panel support, comprising:
- a base having an upper surface, a lower surface, a first side surface, a second side surface, a third side surface and a fourth side surface;
- a first leg coupled to said lower surface of said base;
- a second leg coupled to said lower surface of said base;
- an upper leg surface defined in said lower surface of said base between said first leg and said second leg;
- said first leg, said second leg and said upper leg surface defining a base couple and a base channel;
- said base channel receiving the wall for positioning said first leg adjacent to the first wall side, said second leg adjacent to the second wall side and positioning said upper leg surface adjacent to the top wall surface;
- said base couple attaching said base with the wall and supporting the solar panel;
- a first spacer member positioned between said first leg and the first wall side;
- a second spacer member positioned between said second leg and the second wall side; and
- said first spacer member and said second spacer member frictionally engaging said base couple with the wall.

22. A solar panel support for coupling a solar panel to a wall, the wall having a first wall side, a second wall side and a top wall surface, the wall having a wall thickness, a panel couple for securing the solar panel to the solar panel support, the solar panel support, comprising:
- a base having an upper surface, a lower surface, a first side surface, a second side surface, a third side surface and a fourth side surface;
- a first leg coupled to said lower surface of said base;
- a second leg coupled to said lower surface of said base;
- an upper leg surface defined in said lower surface of said base between said first leg and said second leg;
- said first leg, said second leg and said upper leg surface defining a base couple and a base channel;
- said base channel receiving the wall for positioning said first leg adjacent to the first wall side, said second leg adjacent to the second wall side and positioning said upper leg surface adjacent to the top wall surface;
- said base couple attaching said base with the wall and supporting the solar panel;

a first fastener traversing said first leg and engaging into the wall;
a second fastener traversing said second leg and engaging into the wall; and
said first fastener and said second fastener coupling said base with the wall.

\* \* \* \* \*